(12) United States Patent
Nakahara

(10) Patent No.: US 7,620,310 B2
(45) Date of Patent: Nov. 17, 2009

(54) CAMERA HAVING AN AUTOFOCUS SYSTEM

(75) Inventor: Naoto Nakahara, Saitama (JP)

(73) Assignee: Hoya Corporation, Tokyo (JP)

( * ) Notice: Subject to any disclaimer, the term of this patent is extended or adjusted under 35 U.S.C. 154(b) by 360 days.

(21) Appl. No.: 11/609,518

(22) Filed: Dec. 12, 2006

(65) Prior Publication Data

US 2007/0140676 A1  Jun. 21, 2007

(30) Foreign Application Priority Data

Dec. 16, 2005 (JP) ............... 2005-363182

(51) Int. Cl.
G03B 3/00 (2006.01)
G03B 3/10 (2006.01)
G03B 13/34 (2006.01)

(52) U.S. Cl. ............... 396/125; 396/121; 396/127; 396/123

(58) Field of Classification Search ............... 396/103, 396/121, 123, 125, 137
See application file for complete search history.

(56) References Cited

U.S. PATENT DOCUMENTS

| | | | |
|---|---|---|---|
| 5,047,796 A * | 9/1991 | Tagami et al. | ............... 396/132 |
| 5,659,814 A * | 8/1997 | Matsukawa et al. | ......... 396/121 |
| 5,682,559 A * | 10/1997 | Yoshino et al. | ............. 396/121 |
| 6,463,214 B1 | 10/2002 | Nakata | |
| 6,480,266 B2 | 11/2002 | Shirai et al. | |
| 6,859,619 B2 | 2/2005 | Kurosawa | |
| 6,987,538 B1 | 1/2006 | Nakata et al. | |
| 7,058,294 B2 | 6/2006 | Nakahara | |
| 2001/0026683 A1* | 10/2001 | Morimoto et al. | ............. 396/89 |
| 2003/0223740 A1* | 12/2003 | Kajiyama | ................... 396/101 |
| 2006/0120711 A1 | 6/2006 | Nakata | |

(Continued)

FOREIGN PATENT DOCUMENTS

JP  5-210042  8/1993

(Continued)

OTHER PUBLICATIONS

English translation of JP 2004-309867 by Nakahara. Provided by Applicant in IDS submission.*

(Continued)

*Primary Examiner*—W B Perkey
*Assistant Examiner*—Leon W. Rhodes
(74) *Attorney, Agent, or Firm*—Greenblum & Bernstein, P.L.C.

(57) ABSTRACT

An AF camera includes a focusing lens group; an autofocus system which performs a searching process for detecting an in-focus position by moving the focusing lens group within a predetermined searching range to move the focusing lens group to the in-focus position; and a first switch and a second switch. After completion of the searching process, the autofocus system repeats the searching process over a first searching range closer to a far side than a near-side movable end upon the first switch being turned ON, with a current position of the focusing lens group serving as the near-side movable end; and the autofocus system repeats the searching process over a second searching range closer to a near side than a far-side movable end upon the second switch being turned ON, with a current position of the focusing lens group serving as the far-side movable end.

12 Claims, 8 Drawing Sheets

U.S. PATENT DOCUMENTS

2007/0071433 A1* 3/2007 Kawanami .................. 396/127
2007/0071434 A1* 3/2007 Kawanami .................. 396/127
2007/0127138 A1* 6/2007 Nakahara .................... 359/694

FOREIGN PATENT DOCUMENTS

JP 2004-309867 11/2004
JP 2004309867 A * 11/2004

OTHER PUBLICATIONS

English language Abstract of JP 2004-309867.
English language Abstract of JP 5-210042.
U.S. Appl. No. 11/534,683 to Kawanami, filed Sep. 25, 2006.
U.S. Appl. No. 11/534,685 to Kawanami, filed Sep. 25, 2006.
U.S. Appl. No. 11/564,468 to Nakahara, filed Nov. 29, 2006.

* cited by examiner

Initial AF

Fig. 9B

Re-AF SWU ON
(Far Side Range)

Fig. 9C

Re-AF SWD ON
(Near Side Range)

CAMERA HAVING AN AUTOFOCUS SYSTEM

BACKGROUND OF THE INVENTION

1. Field of the Invention

The present invention relates to a camera having an autofocus system with the capability of searching an in-focus position of a focusing lens group while moving the focusing lens group.

2. Description of the Prior Art

A contrast detection (contrast measurement) autofocus system which measures contrast to detect the maximum contrast (or peak contrast) is generally used as an autofocus (AF) system for compact digital cameras. Additionally, a contrast/phase-difference based hybrid autofocus system has been developed (refer to Japanese Laid-Open Patent Publication (Kokai) 2004-309867). According to a conventional contrast detection method, an image capturing operation is repeated to capture images at different lens positions of a focusing lens group while the focusing lens group is driven stepwise between the near side (near extremity) and the far side (far extremity) thereof, a peak contrast value is determined by detecting contrast values of the captured images, and the focusing lens group is moved to a lens position thereof at which the peak contrast value is obtained. Alternatively, a phase-difference method is for determining an in-focus position from a phase difference between divided object images.

In the case of an AF system according the conventional contrast detection method, it is sometimes the case that the camera is focused on a non-target object positioned in front of (on the near side) or behind (on the far side) a target object so as to be focused on the non-target object after the completion of an AF operation. In this case, the photographer will again depress the release button by half a step so that the AF operation is performed again. Nevertheless, in each of the conventional contrast detection autofocus system and the conventional phase-difference autofocus system, it is difficult for the photographer to bring a target object into focus because the focusing lens group is again driven stepwise over the entire range of movement thereof, from the near extremity to the far extremity.

In the aforementioned Japanese Laid-Open Patent Publication 2004-309867, the searching range according to a contrast detection method is limited in accordance with the result of measurement of an AF operation according to a phase-difference method. However, since the searching range is limited to a range having based on (centered about) the lens position of the focusing lens group which is obtained by the phase-difference method, an object detected by the phase-difference method can be brought into focus more precisely; however, an object positioned in front of or behind such an object detected by the phase-difference method cannot be brought into focus.

SUMMARY OF THE INVENTION

The present invention has been devised in view of the above described problems in the conventional autofocus camera, and provides a camera incorporating an autofocus system with which the photographer can easily bring a target object into focus automatically.

According to an aspect of the present invention, an AF camera is provided, including a focusing lens group; an autofocus system which performs a searching process for detecting an in-focus position by moving the focusing lens group along an optical axis within a predetermined searching range to move the focusing lens group to the in-focus position; and a first switch and a second switch. After completion of the searching process, the autofocus system repeats the searching process over a first searching range closer to a far side than a near-side movable end upon the first switch being turned ON, with a current position of the focusing lens group serving as the near-side movable end; and the autofocus system repeats the searching process over a second searching range closer to a near side than a far-side movable end upon the second switch being turned ON, with a current position of the focusing lens group serving as the far-side movable end.

It is desirable for the AF camera to include a release button which activates the searching process upon being depressed by half a step. After completion of the searching process by the half-step depression of the release button, the autofocus system repeats the searching process over the first searching range upon the first switch being turned ON with the release button held depressed in the half-step; and the autofocus system repeats the searching process over the second searching range upon the second switch being turned ON with the release button held depressed in the half-step.

It is desirable for the autofocus system to perform the searching process with a closest focus position in the macro mode serving as the near-side movable end, regardless of whether the macro mode is selected.

It is desirable for the AF camera to include a multi-way control button, wherein the first switch and the second switch are turned ON/OFF in association with an operation of the multi-way control button, and the first switch and the second switch are turned ON upon the multi-way control button being depressed in a first direction and a second direction, respectively.

It is desirable for the AF camera to include an imaging device which captures an object image via a photographing lens having the focusing lens group and converts the captured object image into an electrical image signal. While moving the focusing lens group stepwise, the autofocus system captures an object image each time the focusing lens group is moved by one step, and detects a peak contrast among a plurality of contrasts of the electrical image signals of the captured object images to determine the in-focus position.

It is desirable for the AF camera to include a release button which activates the searching process upon being depressed by half a step, and for stepwise movement of the focusing lens group in the searching process which is initially performed upon the release button being depressed by the half-step to be smaller in step width than that in the searching process which is subsequently performed.

It is desirable for the autofocus system to move the focusing lens group to the in-focus position which is obtained by the initially-performed searching process if the in-focus position is not obtained by the subsequently-performed searching process.

It is desirable for the autofocus system to include a stepping motor for moving the focusing lens group stepwise along the optical axis.

It is desirable for the imaging device to include a light receiving surface on which a plurality of focus detection areas are arranged.

In an embodiment, an autofocus system is provided, including a search function for detecting an in-focus position of a focusing lens group while the autofocus system moves the focusing lens group; and a first switch and a second switch. The autofocus system performs the searching process with a current position of the focusing lens group serving as a near-side movable end thereof over a first searching range closer to a far side than the near-side movable end upon the first switch being turned ON, and the autofocus system performs the searching process with a current position of the focusing lens group serving as a far-side movable end thereof over a second searching range closer to a near side than the far side movable end upon the second switch being turned ON.

In an embodiment, an autofocus system is provided, including a search function for detecting an in-focus position of a focusing lens group while the autofocus system moves the focusing lens group; and an operational member for operating a first switch and a second switch. The autofocus system performs the searching process with a current position of the focusing lens group serving as a near-side movable end thereof over a first searching range closer to a far side than the near-side movable end upon the first switch being operated by the operational member, and the autofocus system performs the searching process with a current position of the focusing lens group serving as a far-side movable end thereof over a second searching range closer to a near side than the far side movable end upon the second switch being operated by the operational member.

In an embodiment, an autofocus system is provided, including a search function for detecting an in-focus position of a focusing lens group while the autofocus system moves the focusing lens group; and an operational member for operating a first switch and a second switch. The autofocus system performs the searching process with a current position of the focusing lens group serving as a near-side movable end thereof over a first searching range closer to a far side than the near-side movable end and moves the focusing lens group to an in-focus position within the first searching range upon the first switch being operated by the operational member, and the autofocus system performs the searching process with a current position of the focusing lens group serving as a far-side movable end thereof over a second searching range closer to a near side than the far side movable end and moves the focusing lens group to an in-focus position within the second searching range upon the second switch being operated by the operational member.

According to the present invention, since it is possible to perform the searching process with the searching range being limited to a far side range or a near side range by the user selecting either a searching range closer to a far side or a near side with respect to an auto-focused object after the object has been brought into focus automatically by the searching process, the photographer can bring a target object into focus swiftly in the case where an auto-focused object is not a target object and where a target object exists on the far side or the near side of the non-target object.

The present disclosure relates to subject matter contained in Japanese Patent Application No. 2005-363182 (filed on Dec. 16, 2005), which is expressly incorporated herein in its entirety.

BRIEF DESCRIPTION OF THE DRAWINGS

The present invention will be discussed below in detail with reference to the accompanying drawings, in which:

FIGS. 9A through 9C show graphs indicating the relationship between positions of the focusing lens group of the digital camera and the respective contrast values there at, and show a manner of visually indicating an in-focus position of the focusing lens group by way of example, wherein

DESCRIPTION OF THE PREFERRED EMBODIMENT

Figure 1:
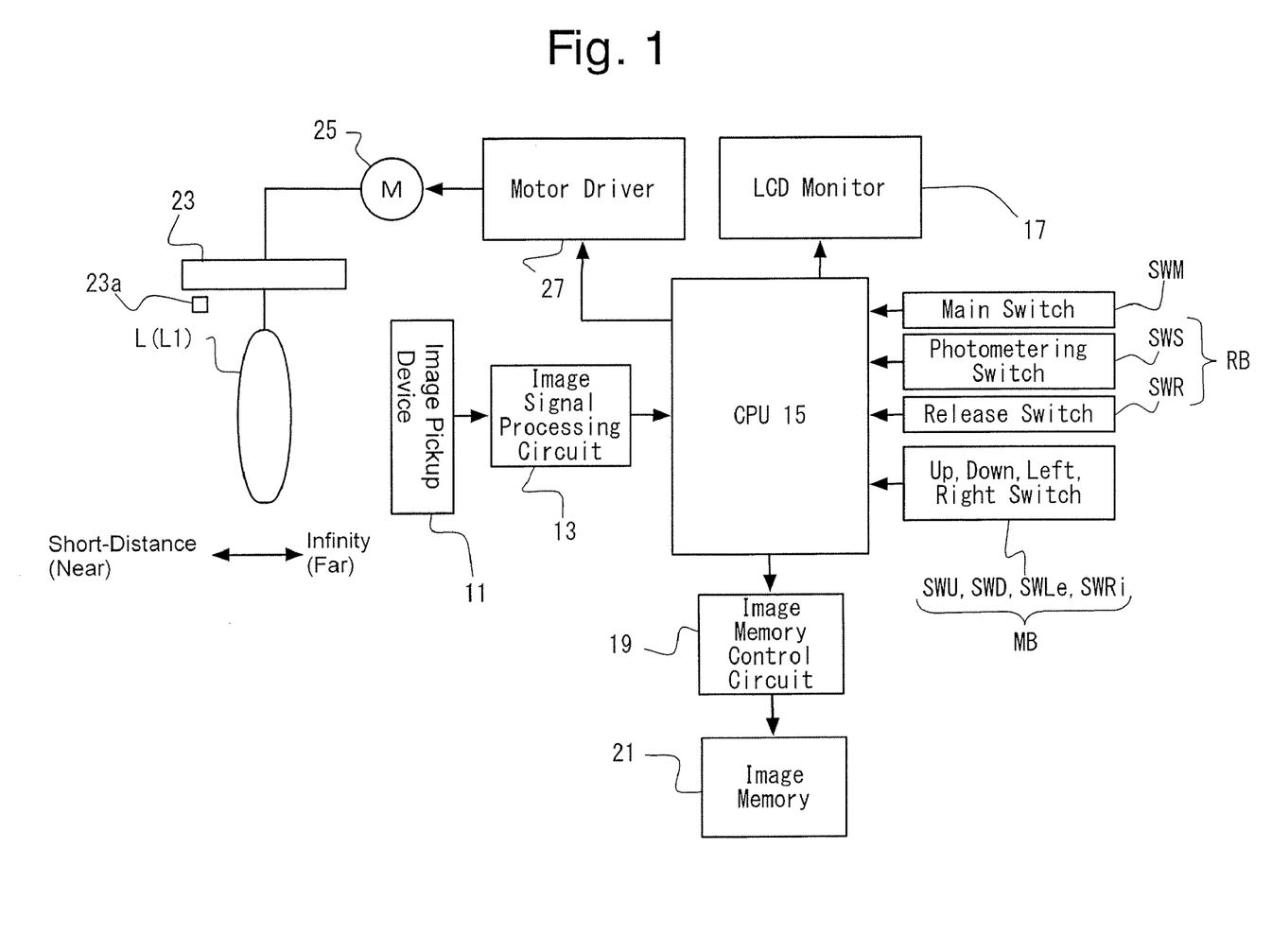
FIG. 1 is a block diagram of elements of an embodiment of a digital camera to which the present invention is applied, showing a basic configuration of the digital camera.

FIG. 1 is a block diagram of essential elements of an embodiment of a compact digital camera to which a focus adjustment apparatus according to the present invention is applied. This compact digital camera is provided with a photographing lens L including a focusing lens group (movable lens group) L1, and an image pickup device (CCD image sensor) 11 serving as an imaging device. An object image is formed on a light receiving surface 12 (see FIG. 2) of the image pickup device 11 via the photographing lens L. The focusing lens group L1 is supported to be freely movable between the infinite focus position (far extremity/position for bringing an object at infinity into focus) and the closest (shortest) focus position (near extremity/position for bringing an object at the shortest distance in working range into focus) and is driven stepwise by an AF motor (stepping motor) 25 under control of a motor driver 27. The motor driver 27 operates on a command from a CPU 15.

The image pickup device 11 includes a large number of pixels (photoelectric transducing elements/photo diodes) arranged in a two-dimensional matrix at predetermined intervals. The digital camera is further provided with an image signal processing circuit 13, an LCD monitor 17, an image memory control circuit 19, an image memory 21 and a lens drive mechanism 23. Each pixel of the image pickup device 11 converts the incident light of an object image thereon into an electrical charge, and the electrical charges is accumulated (integrated). Upon completion of an exposure, the accumulated charges are output, pixel by pixel, as an image signal to the image signal processing circuit 13. The image signal processing circuit 13 performs predetermined adjusting processes such as a white-balance adjusting process and an A/D converting process on the input image signal to output digital image data to the CPU 15. The CPU 15 converts the input image data into an image signal capable of being indicated on the LCD monitor 17 to visually indicate the image data on the LCD monitor 17 in a through mode (monitoring mode), and converts the input image data into image data having a predetermined format to write this image data into the image memory 21 via the image memory control circuit 19.

The digital camera includes the aforementioned AF mode (contrast-detection type AF mode/contrast AF mode). In the AF mode, a focus is detected by a contrast detecting method.

Specifically, in the AF mode, an image capturing operation is performed on the image pickup device 11 while the focusing lens group L1 is driven stepwise in steps of a predetermined amount of movement, a detecting operation for detecting a contrast of image data and a storing operation for storing the contrast value are repeated to detect a peak contrast value in the direction of movement of the focusing lens group L1, and an in-focus position of the focusing lens group L1 is detected in the contrast AF mode, in which a position of the focusing lens group L1 at which the peak contrast value is obtained. The focusing lens group L1 is moved to the in-focus point thus detected. In the present embodiment, the focusing lens group L1 is moved over the range of movement of the focusing lens group L1 in a normal searching process (initial searching process/search function), from the near extremity to the far extremity.

It is sometimes the case that an actual in-focus position of the focusing lens group L1 slightly deviates from a position thereof at which a peak contrast value is obtained because the focusing lens group L1 is driven stepwise. Additionally, in a searching process, it is sometimes the case that a minimum driving amount of the focusing lens group L1 which can be driven stepwise by the AF motor 25 is smaller than a predetermined amount of movement of the focusing lens group L1 which is driven stepwise in the AF mode. With this being the situation, it is desirable to determine a position of the focusing lens group L1 at which an actual peak contrast value is obtained by an approximate calculation based on obtained contrast values to set this lens position thus obtained or a stopped position of the focusing lens group L1 which is closest to this lens position as an in-focus point.

The digital camera is further provided with various switches: a main switch SWM, a photometering switch SWS, a release switch SWR, an up switch SWU, a down switch SWD, a left switch SWLe and a right switch SWRi. The main switch SWM is for turning ON and OFF the power of the digital camera. The photometering switch SWS and the release switch SWR are associated with a release button RB to be turned ON when the release button RB is half and fully depressed, respectively. The up switch SWU, the down switch SWD, the left switch SWLe and the right switch SWRi are associated with a multi-way control button (operational member) MB to be turned ON when the multi-way control button MB is depressed upwards, downwards, leftwards and rightwards, respectively. The CPU 15 checks the ON/OFF states of these various switches, and performs a preset process upon detecting such ON/OFF states or changes in ON/OFF states.

Figure 2:
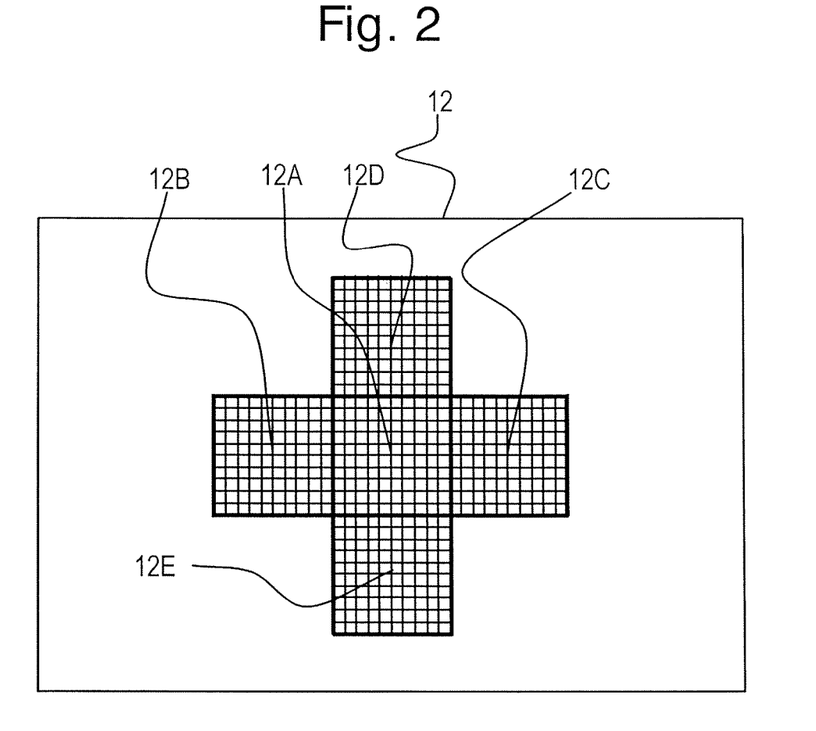
FIG. 2 is a diagrammatic illustration showing the relative position between a light receiving surface of an image pickup device and five focus detection areas on the light receiving surface in the digital camera shown in FIG. 1.
Figure 3:
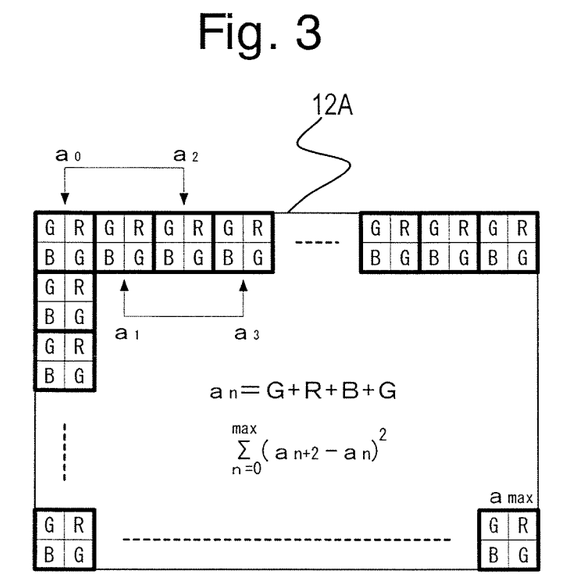
FIG. 3 is a diagrammatic illustration showing the arrangement of primary-color filters of the image pickup device.

FIG. 2 shows the relative position between the light receiving surface 12 of the image pickup device 11 and five focus detection areas: first through fifth focus detection areas 12A, 12B, 12C, 12D and 12E, arranged on the light receiving surface 12 in the shape of a cross, by way of example. FIG. 3 is an enlarged view of the first (central) focus detection area 12A. Each of the remaining four focus detection areas 12B through 12E has the same structure as the first focus detection area 12A, and accordingly, only the first focus detection area 12A is shown in FIG. 3. The first focus detection area 12A is positioned at substantially the center of the light receiving surface 12, the second and third focus detection areas 12B and 12C are positioned on laterally opposite sides of the first focus detection area 12A, and the fourth and fifth focus detection areas 12D and 12E are positioned on vertically opposite sides of the first focus detection area 12A. Primary-color filters (red (R), green (G) and blue (B) filters) are disposed in front of each pixel (photoelectric transducing element) on the object side thereof, and each pixel on the light receiving surface 12 transduces the red, green and blue components of the incident rays of object light that are passed through the primary-color filters into electrical charges, and these electrical charges are accumulated. The electrical charges thus accumulated for a predetermined period of time are read out of the image pickup device 11 pixel by pixel to be output as an image signal.

FIG. 3 shows a typical arrangement (Bayer array) of primary-color filters. In the contrast AF process in the illustrated embodiment of the digital camera, four pixels (a 2 by 2 matrix of pixels) in each square, namely, a combination of two green filters, a red filter and a blue filter is treated as one pixel block, and the sum of the magnitudes of image signals integrated by the four pixels in each pixel block is regarded as intensity $a_n$ ($a_n$=G+R+B+G).

Accordingly, an operation for determining the difference between the intensity $a_n$ of a pixel block and the intensity $a_n$ of another pixel block positioned one pixel-block away from the previous pixel block in the horizontal direction is repeated successively in the horizontally rightward direction within the first focus detection area 12A while the differences thus determined ($a_{n+2}-a_n$) are added up. Upon completion of these difference determining and adding operations on the pixel block at the right end of the first focus detection area 12A in the horizontal direction, the difference determining and adding operations are repeated on a subsequent row of pixel blocks one pixel block below the previous row of pixel blocks in the vertical direction until completion of the determining operation on the pixel block at the right end of the first focus detection area 12A in the horizontal direction and completion of the adding operation thereof. Such difference determining and adding operations are repeated on all the pixel blocks in the first focus detection area 12A. Subsequently, the same operations are performed on each of the remaining four focus detection areas 12B through 12E.

The sum of the differences ($a_{n+2}-a_n$) on each of the first through fifth focus detection areas 12A through 12E corresponds to the contrast value on the focus detection area at the current position of the focusing lens group L1. The contrast value can be represented by the following expression 1:

$$\sum_{n=0}^{max} (a_{n+2} - a_n)^2 \qquad \text{[Expression 1]}$$

In the present embodiment, upon the release button RB being depressed by half a step to turn ON the photometering switch SWS, images are consecutively captured via the image pickup device 11 while the focusing lens group L1 is driven stepwise via the motor driver 27, the AF motor 25 and the lens drive mechanism 23, the image signals are input from the first through fifth focus detection areas 12A through 12E to determine the contrast values on the first through fifth focus detection areas 12A through 12E, respectively; and the determined contrast values are stored in an internal RAM of the CPU 15 as contrast data, under control of the CPU 15. The CPU 15 repeats this process (contrast AF process) while moving the focusing lens group L1 stepwise in the direction from the near extremity toward the far extremity (from one movable extremity toward the other movable extremity of the focusing lens group L1). Although the focusing lens group L1 is moved stepwise in the direction from the near extremity toward the far extremity in this particular embodiment, it is possible for the focusing lens group L1 to be moved stepwise in the opposite direction, i.e., in the direction from the far extremity toward the near extremity.

The position (lens position) of the focusing lens group L1 in the optical axis direction is detected by an origin sensor 23a with the near extremity of the focusing lens group L1 being predetermined as a point of origin, and is counted as the number of drive pulses from the point of origin. The drive pulses are defined as, e.g., pulses output from an encoder such as a photo-interrupter installed on the output shaft of the AF motor 25. Although several hundreds of pulses or more are usually necessary for driving the focusing lens group L1 from the far extremity to the near extremity, it is assumed that several pulses or several dozen pulses are only necessary for driving the focusing lens group L1 (while capturing images) in a stepwise manner from the far extremity to the near extremity in the contrast AF process in the present embodiment of the digital camera for the purpose of simplifying the description. In addition, in the drive pulses used in the contrast AF process in the present embodiment of the digital camera, it is assumed that one position pulse constitutes more than one pulse output from the aforementioned photo-interrupter in the contrast AF process in the present embodiment of the digital camera. In the following description, the number of pulses counted from the near extremity is represented by "CNo" and the current position (current lens position) of the focusing lens group L1 is represented by "current lens position CNo".

Immediately after contrast values at the plurality of lens positions in the direction from the near extremity toward the far extremity are obtained, contrast values at two adjacent lens positions of the focusing lens group L1 are compared with each other successively at consecutive lens positions in a direction of movement of the focusing lens group L1, e.g., in a direction from a position of the focusing lens group L1 on the near side to a position of the focusing lens group L1 on the far side, to determine whether or not the contrast value increases successively a predetermined number of times and subsequently decreases successively a predetermined number of times, i.e., to determine whether or not the contrast value obtained at the central position is a peak contrast value.

In the present embodiment of the digital camera, it is determined whether or not the contrast value increases two times consecutively, and subsequently decreases two times consecutively based on a group of obtained contrast values at consecutive five lens positions in the direction from the near extremity toward the far extremity of the focusing lens group L1, i.e., whether or not the contrast value of the middle (third) lens position of the five lens positions is a peak contrast value. Thereafter, the same determining operation is repeated on another group of five contrast values at consecutive five lens positions which are shifted one by one toward either the near extremity or the far extremity with respect to the previous five lens positions.

Additionally, if it is determined that the contrast value of the middle lens position of the five lens positions is a peak contrast value, it is determined whether or not the reliability of this peak contrast value is high. Only when it is determine that the reliability of this peak contrast value is high, the contrast value of the middle lens position of the five lens positions is stored in memory as a peak contrast value.

Upon the focusing lens group L1 being driven stepwise to one end of the range of movement thereof, the focusing lens group L1 is moved to the lens position thereof at which a peak contrast value stored in memory is obtained, and stopped thereupon. In the present embodiment, the up switch SWU and the down switch SWD serve as a first switch (distant view switch) and a second switch (foreground switch), respectively. In this state, upon the up switch SWU or the down switch SWD being turned ON, a repeat-search process is performed (i.e., the aforementioned searching process is performed again) If the up switch SWU is turned ON, the current lens position, at which the focusing lens group L1 is currently at rest, is regarded as a search commencement end and the searching process (repeat-search process) commences from this search commencement end toward the far side, i.e., in the direction toward the far extremity. Namely, this repeat-search process is performed to detect (search) a peak contrast value over a searching range closer to the far extremity than the current lens position. On the other hand, if the down switch SWD is turned ON, the current lens position, at which the focusing lens group L1 is currently at rest, is regarded as a search terminal end while the near extremity is regarded as a search commencement end, and the searching process (repeat-search process) commences from this near extremity as the search commencement end in the direction toward the current lens position, i.e., commences from a lens position on the side closer to the near extremity than the current lens position. Namely, this repeat-search process is performed to detect (search) a peak contrast value over a searching range closer to the near side than the current lens position. Due to the above described repeat-search process, an object positioned closer to the far extremity or the near extremity than the currently-focused object can be brought into focus. Note that the aforementioned first and second switches can be respectively assigned to any two of the four switches: the up switch SWU, the down switch SWD, the left switch SWLe and the right switch SWRi that are associated with the multi-way control button MB, and it is possible for such assignments to be freely set by the user.

Additionally, in the repeat-search process, the driving amount of each driving step of the focusing lens group L1 can be set smaller (i.e., a narrower step) than that in the normal searching process. Since this step width is reduced, a peak contrast value can be detected with a higher degree of precision. Moreover, in the case where the digital camera has a macro mode (close-up picture mode), the repeat-search process can be carried out over the full photographic range including the macro range regardless of whether or not the macro mode is selected when the repeat-search process is performed toward the near extremity, which makes it possible to bring an object at close range into focus without selecting the macro mode.

Operations of the present embodiment of the digital camera will be discussed with reference to the flow charts shown in FIGS. 4 through 7 and a relationship between the position of the focusing lens group L1 and contrast values shown in FIGS. 9A through 9C.

Figure 4:
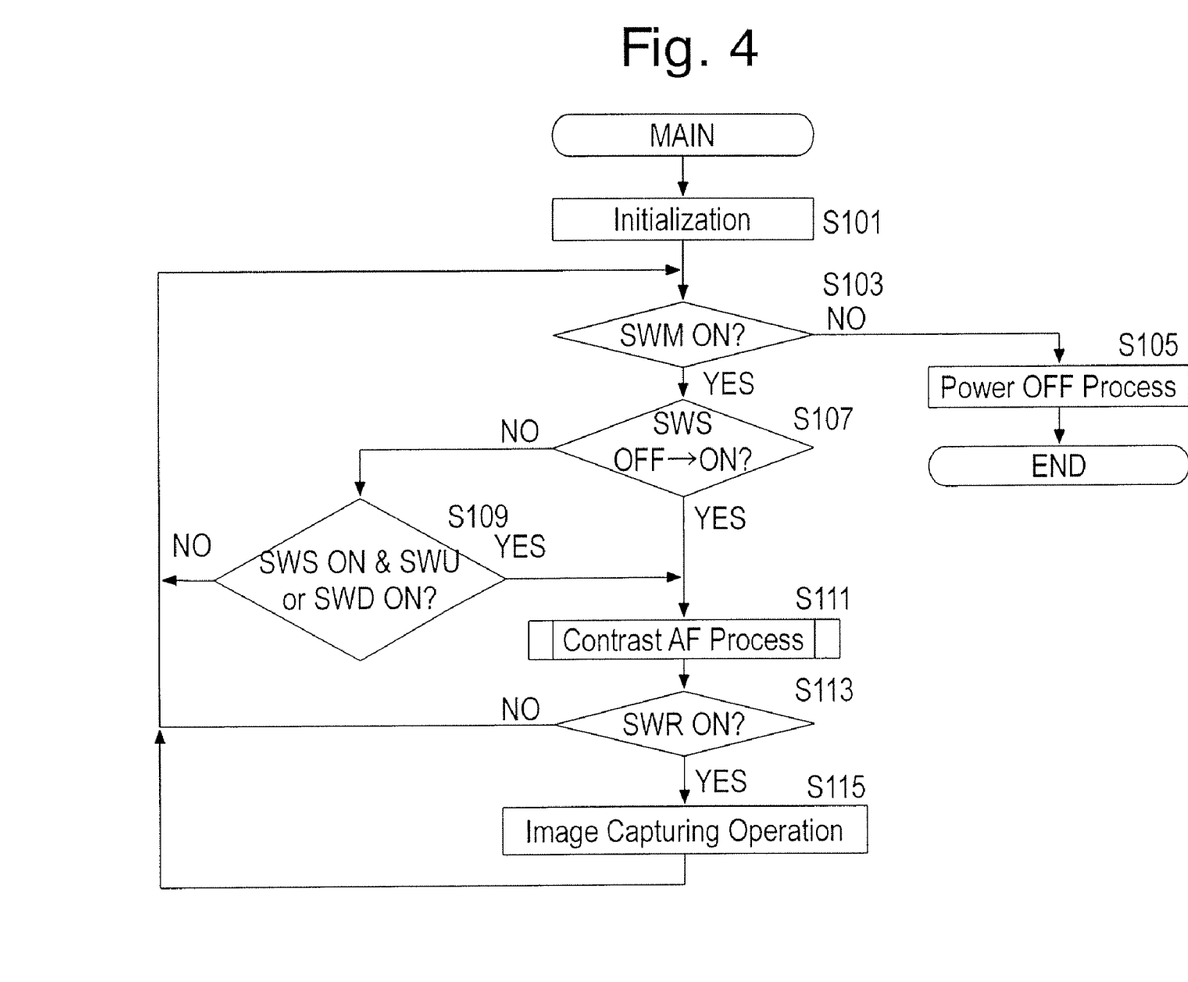
FIG. 4 is a flow chart showing a main process performed in the digital camera shown in FIG. 1.

FIG. 4 shows a main process of the present embodiment of the digital camera. Control enters this process upon a battery (not shown) being loaded into the camera. In the main process, firstly the CPU 15 performs an initializing process (step S101). Subsequently, it is determined whether or not the main switch SWM is ON (step S103). If the main switch is not ON (if NO at step S103), control ends. Thereafter, the CPU 15 is periodically activated to check the ON/OFF state of the main switch SWM (step S103).

If the main switch is ON (if YES at step S103), it is determined whether or not the photometering switch SWS has been turned ON from the OFF state (step S107). If the photometering switch SWS has been turned ON from the OFF state (if YES at step S107), a contrast AF process (see FIG. 5) is performed (step S111). Subsequently, it is determined whether or not the main switch SWM is ON (step S113), an image capturing operation is performed (step S115), and control returns to step S103 if it is determined at step S113 that the main switch is ON. Control returns to step S103 from step S113 if it is determined at step S113 that the main switch is OFF.

If the photometering switch SWS has not been turned ON from the OFF state (if NO at step S107), it is determined whether or not the photometering switch SWS is ON while the up switch SWU or the down switch SWD is ON (step S109). If the photometering switch SWS is not ON or both the up switch SWU and the down switch SWD are OFF (if NO at step S109), control returns to step S103. If the photometering switch SWS is ON and also the up switch SWU or the down switch SWD is ON (if YES at step S109), control proceeds to the contrast AF process at step S111. Accordingly, if the up switch SWU or the down switch SWD is turned ON with the photometering switch SWS being held in the ON state thereof after the completion of the contrast AF process, the contrast AF process is performed again.

Note that in the case where an in-focus state is achieved in the contrast AF process at step S111, it is desirable to display the focused area within the focus detection areas 12A through 12E, and, e.g., increase the brightness of the area corresponding to the LCD monitor 17 or display the picture frame in order to facilitate determining whether the target object positioned near or far away.

[Contrast AF Process]

Figure 5:
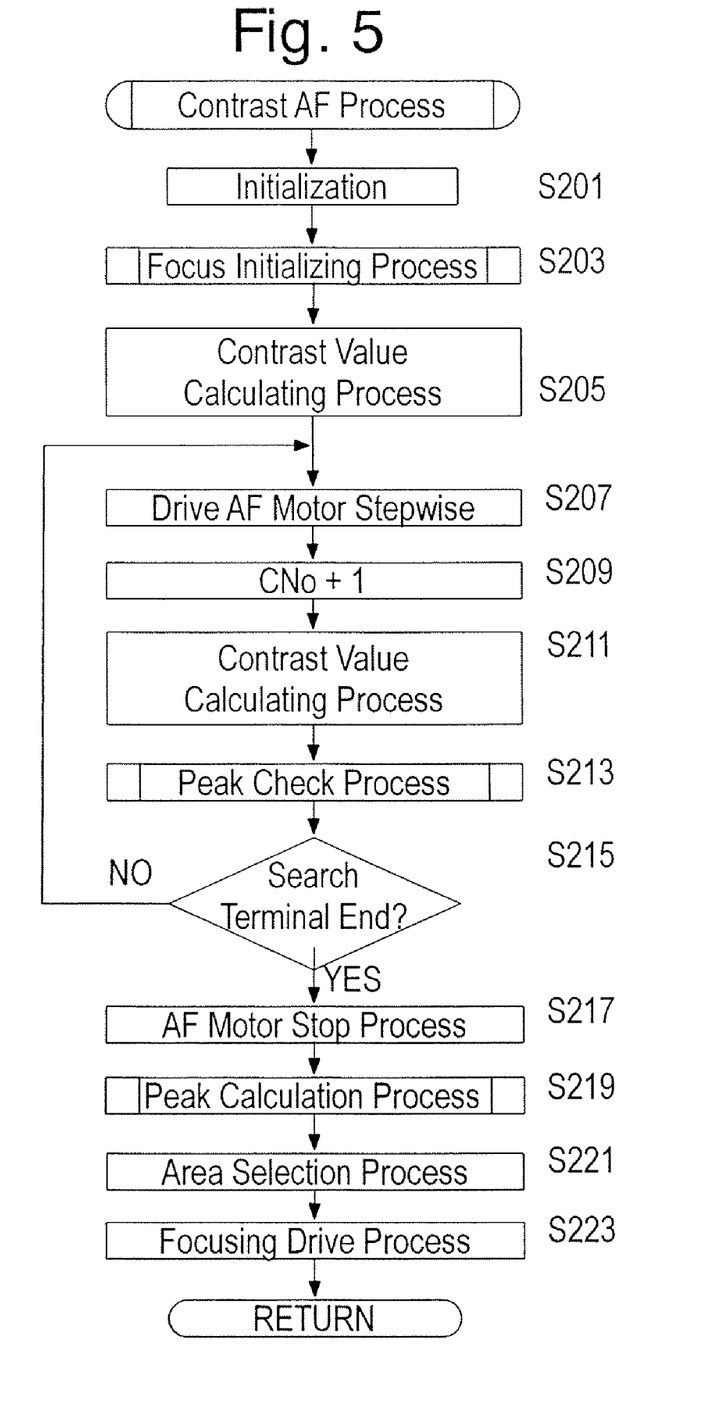
FIG. 5 is a flow chart showing a sub-routine "Contrast AF Process" performed in the main process shown in FIG. 4.

The contrast AF process that is performed at step S111 will be discussed in detail with reference to the flow chart shown in FIG. 5.

In the contrast AF process, firstly various variables, etc., are initialized (step S201). For instance, each status (flag) is cleared (i.e., set to 0), contrast values are cleared, the current lens position CNo is initialized (CNo=0), the peak contrast value is cleared (set to zero), and the minimum contrast value is set to FFFFFFFF in the present embodiment of the digital camera. The current lens position CNo is a variable which is incremented every time the focusing lens group L1 moves toward the far extremity (infinite focus position) by one pulse (drive pulse), wherein the current lens position CNo is zero when the focusing lens group L1 is positioned at the near extremity (closest focus position).

Subsequently, a focus initializing process (see FIG. 6) is performed (step S203). In this focus initializing process, the focusing lens group L1 is moved to the near extremity and a driving speed is set to A[pps] in the normal searching process, or the focusing lens group L1 is either moved to the near extremity or held at the current lens position, the driving speed is set to B[pps], a search terminal end setting process and other processes are performed in the repeat-search process. In the focus initializing process, the near extremity of the focusing lens group L1 is designated as the search commencement end thereof in the normal searching process, and the near extremity or the current lens position of the focusing lens group L1 is designated as the search commencement end thereof in the repeat-search process. In addition, the far extremity of the focusing lens group L1 is designated as the search terminal end thereof in the normal searching process, and the current lens position or the far extremity of the focusing lens group L1 is designated as the search terminal end thereof in the repeat-search process. Each of the driving speed A[pps] and the driving speed B[pps] represents a drive pulse number for diving the focusing lens group L1 by one step. The driving speed A[pps] is greater than the driving speed B[pps]. Namely, the drive pulse number for driving the focusing lens group L1 by one step in the repeat-search process is smaller than that in the normal searching process; the amount of movement of the focusing lens group L1 by one step in the repeat-search process is smaller than that in the normal searching process.

Figure 6:
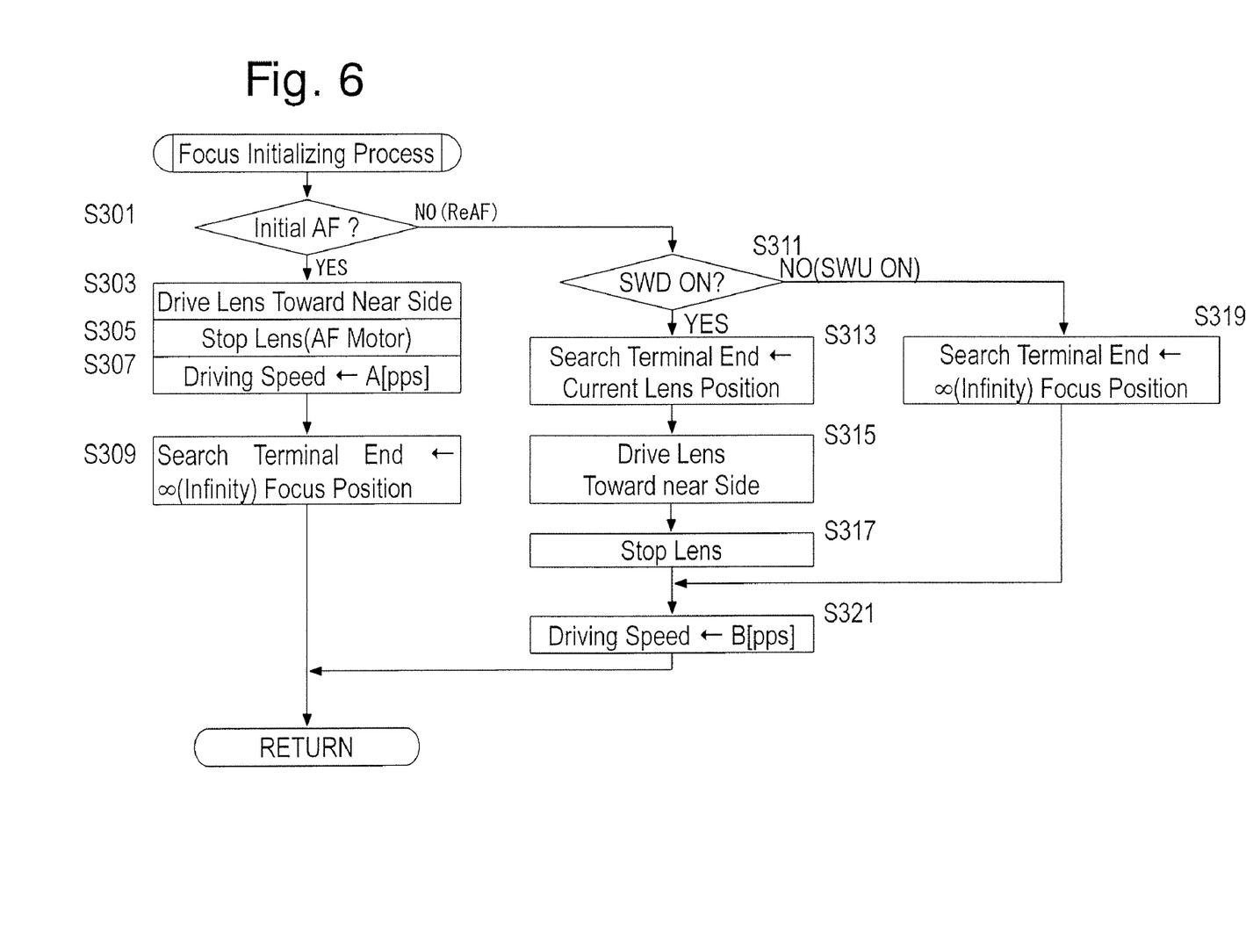
FIG. 6 is a flow chart showing a sub-routine "Focus Initializing Process" performed in the contrast AF process shown in FIG. 5.

In addition, unit pulse of the current lens position CNo is A[pps] when the driving speed is A[pps], and unit pulse of the current lens position CNo is B[pps] when the driving speed is B[pps].

After the completion of the focus initialing process at step S203, a contrast value calculating process at the initial stop position of the focusing lens group L1 (step S205) is performed. Namely, based on the image data input from the image pickup device 11, the contrast value Cnt[CNo] at the position of the focusing lens group L1 where the focusing lens group L1 stops at the near extremity or where the focusing lens group L1 stops in an initial AF process (normal AF process/normal searching process) is calculated, and each of the peak contrast value Max and the minimum contrast value Min of the contrast value Cnt[CNo] is updated.

A motor driving process in which the AF motor 25 is driven stepwise in a direction to move the focusing lens group L1 toward the far extremity is started (step S207). Namely, the focusing lens group L1 is made to start moving stepwise by one drive pulse (A[pps] or B[pps]) in a direction toward the far extremity. Subsequently, the current lens position CNo is increased by one (step S209).

Subsequently, upon the focusing lens group L1 having been moved stepwise by one drive pulse, a contrast value calculating process is performed wherein the contrast value Cnt[CNo] is calculated in accordance with image data input from the image pickup device 11, and each of the peak contrast value and the minimum contrast value is updated (step S211). Subsequently, a peak check process (see FIG. 7) is performed which determines whether the contrast value Cnt[CNo] calculated at step S211 is a peak contrast value which satisfies predetermined conditions (step S213).

Subsequently, it is determined whether or not the focusing lens group L1 has reached the search terminal end thereof (step S215). If the focusing lens group L1 has not reached the search terminal end thereof (if NO at step S215), control returns to step S207 so that the above described operations at steps S207 through S213 are repeated until it is determined at step S215 that the focusing lens group L1 has reached the search terminal end thereof.

If the focusing lens group L1 has reached the search terminal end thereof (if YES at step S215), the AF motor 25 is stopped (step S217). Subsequently, a peak calculation process (see FIG. 8) for calculating a precise peak position (by linear approximation) is performed in accordance with the five contrast values Cnt[Cno−4] through Cnt[CNo] (which includes the contrast value Cnt[PCNo−2] as the central contrast value among the five contrast values) at consecutive five lens positions which are obtained in the loop process at steps S207 through S215 (step S219). The precise peak position obtained by the peak calculation process is a peak position based on the minimum drive pulse number with which the focusing lens group L1 can be driven stepwise.

Subsequently, an area selection process in which one of the five focus detection areas 12A through 12E is selected is performed (step S221). Namely, in the area selection process, a peak position is selected from among peak positions of the contrast values obtained at each focus detection area. For instance, a peak position corresponding to the closest distance is selected as an in-focus position.

Thereupon, a focusing drive process in which the focusing lens group L1 is moved to a lens position thereof which corresponds to the selected peak position (in-focus position) is performed (step S223), and control returns.

Figure 9A:
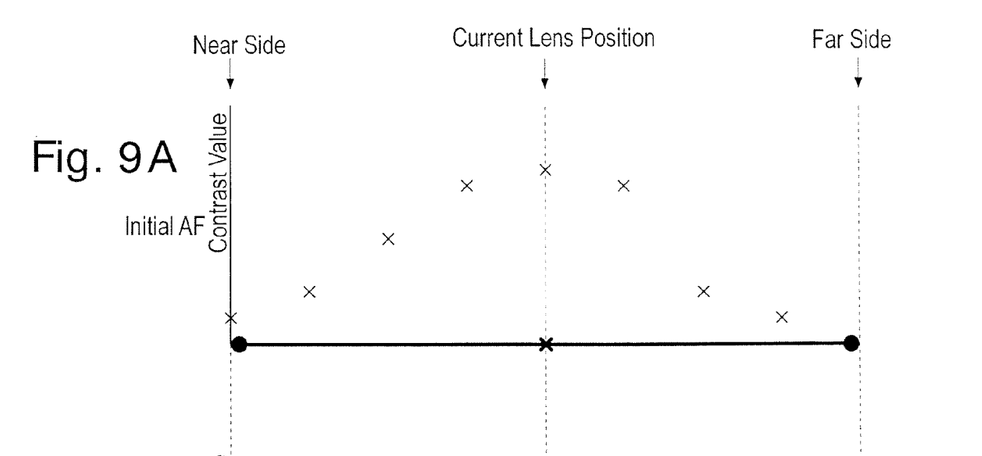
FIG. 9A shows a state at the completion of a normal searching process.
Figure 9B:
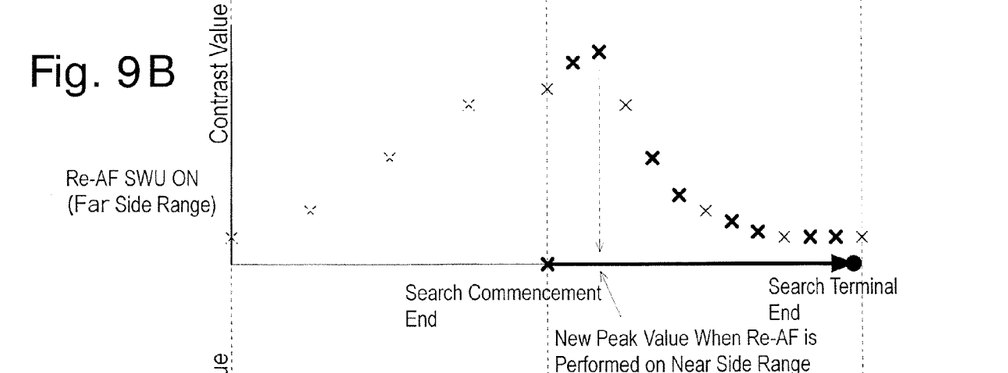
FIG. 9B shows a state where a repeat-search process is performed over a searching range on the far side, and FIG. 9C show a state where the repeat-search process is performed over a searching range on the near side.
Figure 9C:
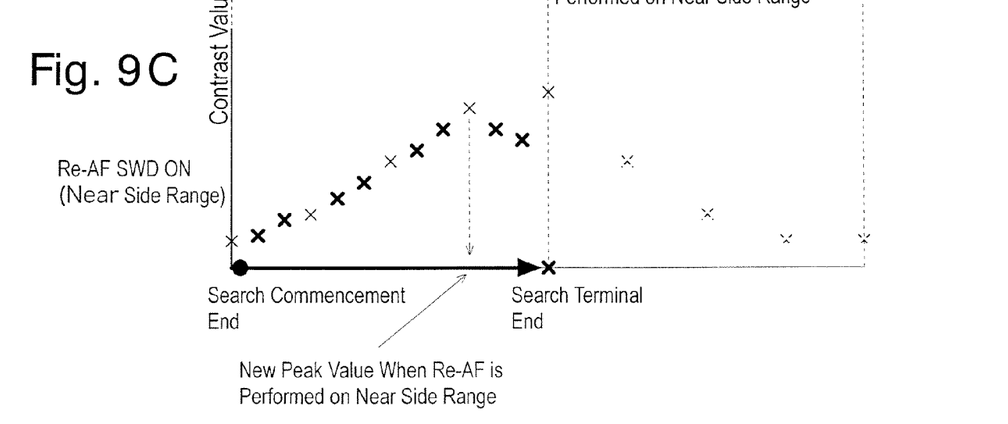

FIGS. 9A through 9C show graphs which each indicate the relationship between positions (including the current lens position CNo) of the focusing lens group L1 and the respective contrast values thereat. In FIGS. 9A through 9C, the horizontal axis and the vertical axis represent the lens position of the focusing lens group L1 and the contrast value, respectively.

FIG. 9A shows a state where a peak contrast value (peak position) obtained by the initial AF process. In this state, if the up switch SWU is turned ON with the photometering switch SWS held in the ON state, contrast values are obtained while the focusing lens group L1 is driven stepwise in steps smaller than the steps in the case of the initial AF process.

FIG. 9B shows a state where a peak position has been obtained in the repeat-search process at a position some distance farther from the position at which the peak position is obtained by the initial AF process.

FIG. 9C shows an operating state where the down switch SWD is turned ON with the photometering switch SWS held in the ON state in the state shown in FIG. 9A. The graph shown in FIG. 9C shows a state where contrast values have been detected while the focusing lens group L1 was driven stepwise from the near extremity to the current lens position in steps smaller than the steps in the case of the initial AF process, and a peak value has been detected at a position some distance closer to the near extremity than the current position.

[Focus Initializing Process]

The focus initializing process that is performed at step S203 in the contrast AF process will be discussed in detail with reference to the flow chart shown in FIG. 6.

In the focus initializing process, firstly it is determined whether or not the current contrast AF process is the initial AF process (normal searching process) (step S301). In the main process, the current contrast AF process becomes the initial AF process (normal searching process) when control proceeds to step S107 to step S111. In the case of the initial AF process (normal searching process) (if YES at step S301), the AF motor 25 is driven in a direction to move the focusing lens group L1 toward the near extremity (step S303), and is subsequently stopped upon the focusing lens group L1 reaching the near extremity (step S305). Subsequently, the driving speed for driving the AF motor 25 stepwise is set to A[pps] (step S307). Additionally, the far extremity of the focusing lens group L1 is set to serve as the search terminal end thereof (step S309), and control returns. Since the driving speed A[pps] is a drive pulse number for driving the AF motor 25 by one step, the AF motor 25 is continuously driven by the set drive pulse number at the driving speed A[pps] and temporality comes to a halt in the searching process, and an image capturing operation is performed via the image pickup device 11 and an image signal inputting process is performed upon the AF motor 25 coming to a halt.

If it is determined that the current contrast AF process is not the initial AF process (normal searching process) (if NO at step S301), i.e., in the case of the repeat-search process (repeat-AF process) (in the case where control proceeds to step S111 from step S109), it is determined whether or not the down switch (foreground switch) SWD is ON (step S311). If the down switch (foreground switch) SWD is ON (if YES at step S311), the current position of the focusing lens group L1, i.e., the current lens position CNo is set to serve as the search terminal end thereof (step S313). Subsequently, the AF motor 25 is driven in a direction to move the focusing lens group L1 toward the near extremity (step S315), and is subsequently stopped upon the focusing lens group L1 reaching the near extremity (step S317). Subsequently, the driving speed for driving the AF motor 25 stepwise is set to B[pps] (step S321), and control returns. Since the driving speed B[pps] is smaller than the driving speed A[pps], the drive pulse number for driving the focusing lens group L1 by one step is smaller than that in the normal searching process so that the focusing lens group L1 is driven stepwise in steps of smaller distances.

FIG. 9C shows an embodiment of a result of the repeat-search process when the down switch (foreground switch) SWD is turned ON. In this embodiment, a peak contrast value, i.e., an in-focus position is detected on the near side at a position three drive pulses (B[pps]) closer to the near extremity (search commencement end) than the current position of the focusing lens group L1.

If a macro mode is available in the present embodiment of the digital camera, the closest focus position in the macro mode can be designated as the near extremity when the down switch (foreground switch) SWD is turned ON. According to this configuration, an autofocus operation can be carried out over the full photographic range including the macro range with no need to select the macro mode.

If the down switch (foreground switch) SWD is not ON (if NO at step S311), the far extremity of the focusing lens group L1 is set to serve as the search terminal end thereof (step S319), the driving speed for driving the AF motor 25 stepwise is set to B[pps] (step S321), and control returns.

FIG. 9B shows an embodiment of a result of the repeat-search process when the up switch (distant view switch) SWU is turned ON. In this embodiment, a peak contrast value, i.e., an in-focus position is detected on the far side at a position two drive pulses (B[pps]) closer to the far extremity (search terminal end) than the current position of the focusing lens group L1.

[Peak Check Process]

The peak check process that is performed at steps S117 and S129 will be hereinafter discussed in detail with reference to the flow chart shown in FIG. 7.

In the peak check process, firstly the counter of the current lens position CNo of the focusing lens group L1 is assigned to a variable Pulse [CNo] (step S401). Subsequently, it is determined whether or not the counter of the current lens position CNo is equal to or greater than the counter of the search commencement end, to which four is added (the counter of the current lens position CNo+4) (step S403). This operation at step S403 is performed because no peak contrast value can be detected if five contrast values at consecutive five lens positions of the focusing lens group L1 cannot be obtained. If the current lens position CNo is smaller than the counter of the current lens position CNo to which four is added (if NO at step S403), control returns.

If the current lens position CNo is equal to or greater than the counter of the current lens position CNo to which four is added (if YES at step S403), it is determined whether or not the contrast value of the middle lens position among the five contrast values that include the contrast value of the current lens position is a peak contrast value. In the present embodiment, firstly it is determined whether the contrast value increases two times consecutively from the lens position at the near extremity of the five lens positions to the middle lens position of the five lens positions (step S405). If the contrast value does not increase two times consecutively (if NO at step S405), control returns.

If the contrast value increases two times consecutively (if YES at step S405), it is determined whether the contrast value decreases two times consecutively from the middle lens position of the five lens positions to the current lens position (the lens position at the far extremity of the five lens positions) of the focusing lens group L1 in the group of consecutive five contrast values including the contrast value of the current lens position CNo (step S407). If the contrast value does not decrease two times consecutively (if NO at step S407), control returns. If the contrast value decreases two times consecutively (if YES at step S407), 80 percent of the contrast value (Cnt[Cno−2]) of the middle lens position is assigned to a first threshold value dat0 (step S409).

Subsequently, it is determined whether or not the contrast value of the first threshold value dat0 is greater than the contrast value Cnt[Cno−4] at the lens position at the near extremity of the five lens positions, or it is determined whether or not the contrast value of the first threshold value dat0 is greater than the contrast value Cnt[CNo] at the current lens position (the lens position at the far extremity of the five lens positions) of the focusing lens group L1 (step S411). If the contrast value of the first threshold value dat0 is not greater than the contrast value Cnt[Cno−4] and the contrast value of the first threshold value dat0 is not greater than the contrast value Cnt[CNo] (if NO at step S411), control returns.

If either the contrast value of the first threshold value dat0 is greater than the contrast value Cnt[Cno−4] or the contrast value of the first threshold value dat0 is greater than the contrast value Cnt[CNo] (if YES at step S411), the contrast value of the difference between the peak contrast value (the contrast value (Cnt[Cno−2])) and a minimum value which is divided by the peak contrast value (the contrast value (Cnt[Cno−2]))and multiplied by 100 is assigned as a percentage to a second threshold value dat1 (step S413). The aforementioned minimum value is the minimum contrast value among the contrast values which have been detected and stored by the time control enters the peak check process. Thereafter, it is determined whether the second threshold value dat1 is greater than 10 percent of the minimum value (step S415). If the second threshold value dat1 is not greater than 10 percent of the minimum value (if NO at step S415), control returns.

If the second threshold value dat1 is greater than 10 percent of the minimum value (if YES at step S415), it is determined whether or not the peak contrast value (the contrast value (Cnt[Cno−2])) is equal to or greater than a maximum contrast value (step S417). This maximum contrast value is the maximum contrast value among the contrast values which have been detected and stored by the time control enters the peak check process. If the peak contrast value is not equal to or greater than the maximum contrast value (if NO at step S417), the counter of the current lens position CNo from which two is subtracted is assigned to the peak position PCNo and control returns.

A peak contrast value among the obtained contrast values and the position of the focusing lens group L1 at which this peak contrast value can be obtained in the searching range can be detected in the above described peak check process.

It is sometimes the case that a contrast value which is smaller than the peak contrast value among the contrast values detected in the initial AF process becomes a peak contrast value when a peak contrast value is detected in the repeat-AF process (repeat-search process), rather than in the initial AF process (see FIG. 9C). Under these circumstances, it is desirable that the current lens position obtained in the initial AF process be removed from the searching range in the repeat-AF process or that the contrast value of the same current lens position not be used as the aforementioned maximum contrast value at step S417.

[Peak Calculation Process]

Figure 8:
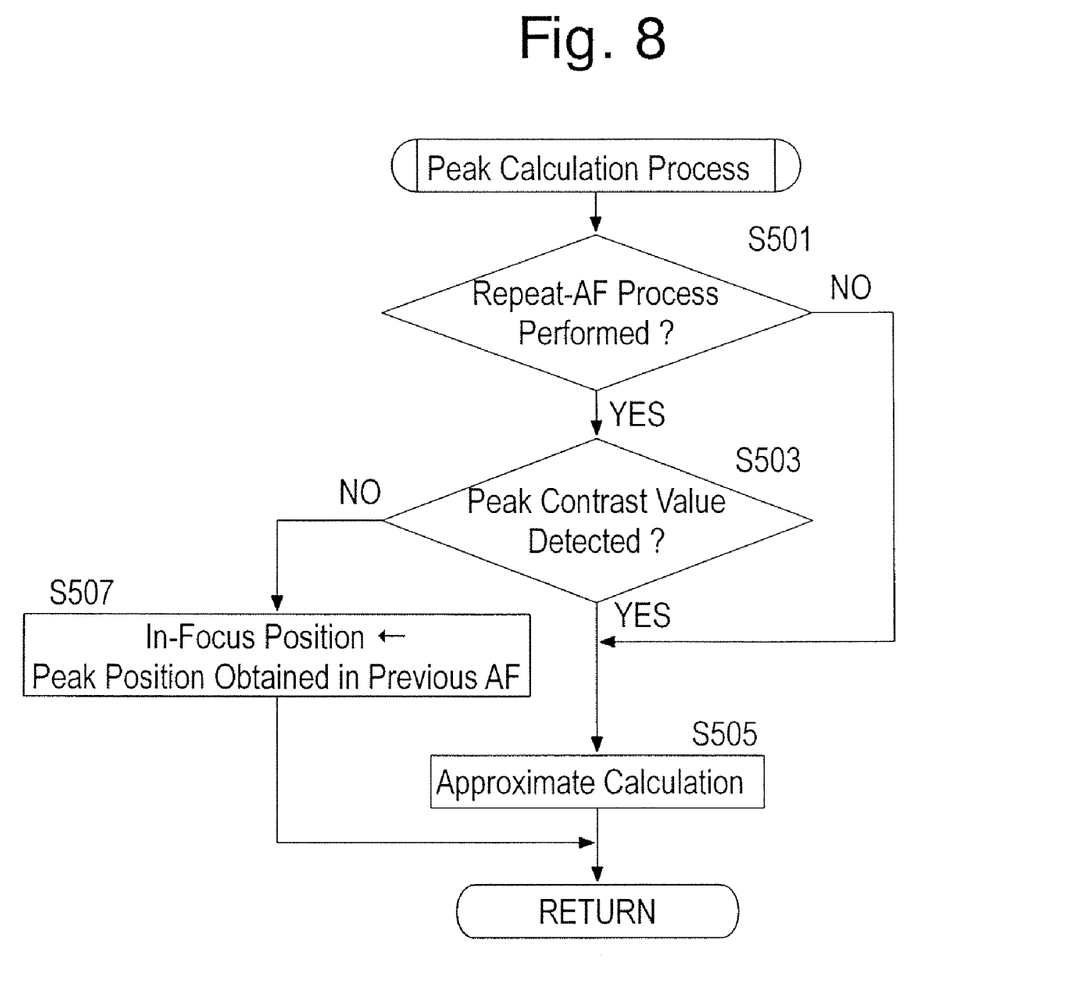
FIG. 8 is a flow chart showing a sub-routine "Peak Calculation Process" performed in the contrast AF process shown in FIG. 5.

An embodiment of a peak calculation process which includes a process performed in the case where no peak contrast value is obtained in the repeat-search process (repeat-AF process) will be hereinafter discussed with reference to the flow chart shown in FIG. 8. This embodiment is characterized in that a focusing operation and an in-focus-state indicating operation are performed at an in-focus position of the focusing lens group L1 which is obtained in the initial AF process (i.e., the search commencement end or the search terminal end in the repeat-search process) if no peak contrast value is obtained in the repeat-AF process.

In the peak calculation process, firstly it is determined whether or not the repeat-AF process has been performed (step S501). If the repeat-AF process has not been performed (if NO at step S501), an approximate calculation by which a more precise in-focus position of the focusing lens group L1 can determined is performed (step S505), and control returns. If the repeat-AF process has been performed (if YES at step S501), it is determined whether or not a peak contrast value has been detected by the repeat-AF process (step S503). If a peak contrast value has been detected by the repeat-AF process (if YES at step S503), the aforementioned approximate calculation is performed based on the contrast values obtained by the repeat-AF process (step S505), and control returns. Such an approximate calculation makes it possible to determine a more precise in-focus position regardless of whether or not the repeat-AF has been performed.

If no peak contrast value has been detected by the repeat-AF process even though the repeat-AF process has been performed (if YES at step S501 and NO at step S503), the peak position obtained in the previous AF process (the search commencement end in the case shown in FIG. 9B where the repeat-AF process has been performed in the far side range or the search terminal end in the case shown in FIG. 9C where the repeat-AF process has been performed in the near side range) is determined as an in-focus position (step S507), and control returns. With this process, even if a peak contrast value cannot be obtained by the repeat-AF process, focus can be achieved at the in-focus position obtained in the previous AF process, so that the camera does not go out of focus by a large amount. In this case, the aforementioned approximate calculation can be performed based on contrast data obtained in the initial AF process (the previous AF process).

Figure 7:
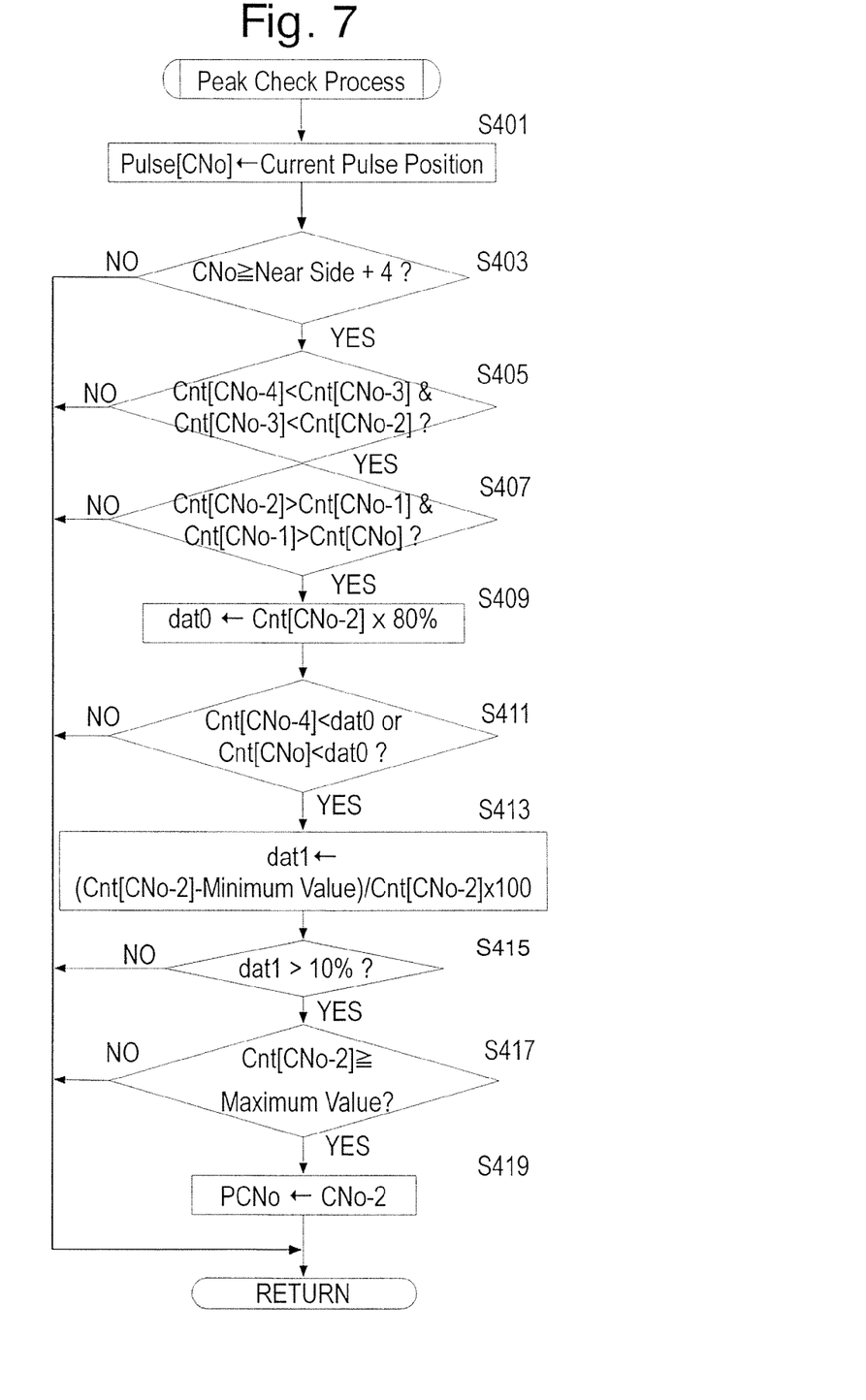
FIG. 7 is a flow chart showing a sub-routine "Peak Check Process" performed in the contrast AF process shown in FIG. 5.

The process for detecting an in-focus position is not limited solely to the peak check process shown in FIG. 7; a conventional contrast-comparing method or the like can be adopted. In addition, although the focusing lens group L1 is driven in the direction toward the far extremity from the near extremity in the above illustrated embodiment, it is possible for the focusing lens group L1 to be driven in the opposite direction. Additionally, in the case of the repeat-search process, it is possible that the focusing lens group L1 be driven toward the near extremity or the far extremity with the current position of the focusing lens group L1 serving as the search commencement end thereof.

Although the first switch (distant view switch) and the second switch (foreground switch) are also used as switches which are associated with the multi-way control button MB, each of the first switch and the second switch can be provided an independent switch.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An AF camera, comprising:
 a focusing lens group;
 an autofocus system which performs a searching process for detecting an in-focus position by moving said focusing lens group along an optical axis within a predetermined searching range to move said focusing lens group to said in-focus position; and a first switch and a second switch, wherein, after completion of said searching process, said autofocus system performs a searching process over a first searching range closer to a far side than a near-side movable end upon said first switch being turned ON, with a current position of said focusing lens group serving as said near-side movable end; and wherein said autofocus system performs a searching process over a second searching range closer to a near side than a far-side movable end upon said second switch being turned ON, with a current position of said focusing lens group serving as said far-side movable end.

2. The AF camera according to claim 1, wherein said AF camera includes a release button which activates said searching process upon being depressed by half a step, and wherein, after completion of said searching process by said half-step depression of said release button, said autofocus system repeats said searching process over said first searching range upon said first switch being turned ON with said release button held depressed in said half-step; and said autofocus system repeats said searching process over said second searching range upon said second switch being turned ON with said release button held depressed in said half-step.

3. The AF camera according to claim 1, wherein said AF camera comprises a macro mode, wherein said autofocus system performs said searching process over said second searching range with a closest focus position in said macro mode serving as said near-side movable end, regardless of whether said macro mode is selected.

4. The AF camera according to claim 1, wherein said AF camera comprises a multi-way control button, wherein said first switch and said second switch are turned ON/OFF in association with an operation of said multi-way control button, and wherein said first switch and said second switch are turned ON upon said multi-way control button being depressed in a first direction and a second direction, respectively.

5. The AF camera according to claim 1, further comprising:

an imaging device which captures an object image via a photographing lens having said focusing lens group and converts said captured object image into an electrical image signal, wherein, while moving said focusing lens group stepwise, said autofocus system captures an object image each time said focusing lens group is moved by one step, and detects a peak contrast among a plurality of contrasts of said electrical image signals of said captured object images to determine said in-focus position.

6. The AF camera according to claim 5, wherein said AF camera includes a release button which activates said searching process upon being depressed by half a step, and wherein stepwise movement of said focusing lens group in said searching process which is initially performed upon said release button being depressed by the half-step is smaller in step width than that in said searching process which is subsequently performed.

7. The AF camera according to claim 6, wherein said autofocus system moves said focusing lens group to said in-focus position which is obtained by said initially-performed searching process if said in-focus position is not obtained by said subsequently-performed searching process.

8. The AF camera according to claim 1, wherein said autofocus system comprises a stepping motor for moving said focusing lens group stepwise along said optical axis.

9. The AF camera according to claim 5, wherein said imaging device includes a light receiving surface on which a plurality of focus detection areas are arranged.

10. An autofocus systems comprising:

a search function for detecting an in-focus position of a focusing lens group while said autofocus system moves said focusing lens group; and a first switch and a second switch, wherein said autofocus system performs said searching process with a current position of said focusing lens group serving as a near-side movable end thereof over a first searching range closer to a far side than said near-side movable end upon said first switch being turned ON, and wherein said autofocus system performs said searching process with a current position of said focusing lens group serving as a far-side movable end thereof over a second searching range closer to a near side than said far side movable end upon said second switch being turned ON.

11. An autofocus systems comprising:

a search function for detecting an in-focus position of a focusing lens group while said autofocus system moves said focusing lens group; and an operational member for operating a first switch and a second switch, wherein said autofocus system performs said searching process with a current position of said focusing lens group serving as a near-side movable end thereof over a first searching range closer to a far side than said near-side movable end upon said first switch being operated by said operational member, and wherein said autofocus system performs said searching process with a current position of said focusing lens group serving as a far-side movable end thereof over a second searching range closer to a near side than said far side movable end upon said second switch being operated by said operational member.

12. An autofocus systems, comprising:

a search function for detecting an in-focus position of a focusing lens group while said autofocus system moves said focusing lens group; and an operational member for operating a first switch and a second switch, wherein said autofocus system performs said searching process with a current position of said focusing lens group serving as a near-side movable end thereof over a first searching range closer to a far side than said near-side movable end and moves said focusing lens group to an in-focus position within said first searching range upon said first switch being operated by said operational member, and wherein said autofocus system performs said searching process with a current position of said focusing lens group serving as a far-side movable end thereof over a second searching range closer to a near side than said far side movable end and moves said focusing lens group to an in-focus position within said second searching range upon said second switch being operated by said operational member.

* * * * *